July 13, 1965   S. A. BROWN   3,194,914
CENTRIFUGAL SWITCH EMBODYING MAGNETS
Filed Nov. 14, 1960   2 Sheets-Sheet 1
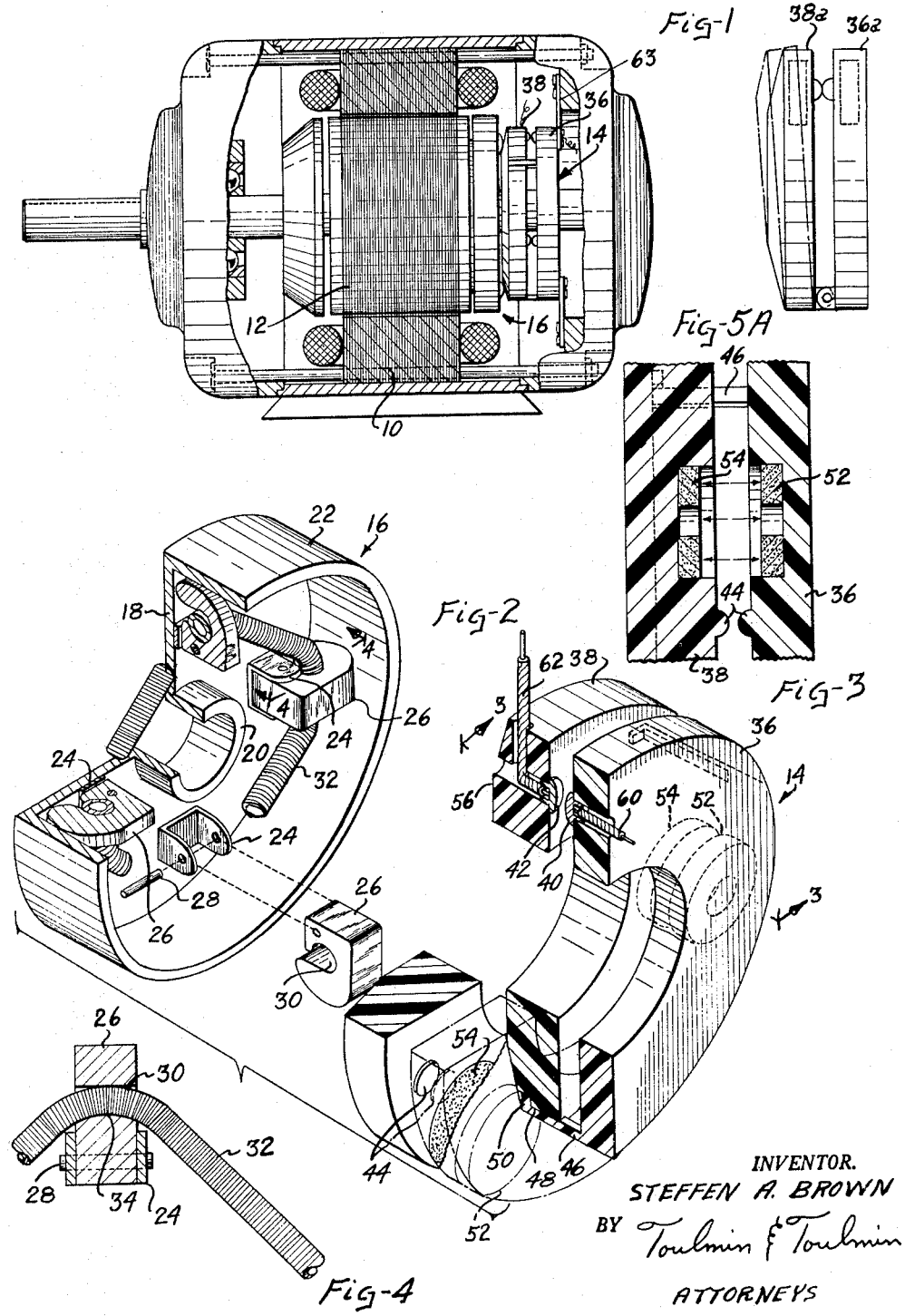
INVENTOR.
STEFFEN A. BROWN
BY Toulmin & Toulmin
ATTORNEYS July 13, 1965 S. A. BROWN 3,194,914
CENTRIFUGAL SWITCH EMBODYING MAGNETS
Filed Nov. 14, 1960 2 Sheets-Sheet 2
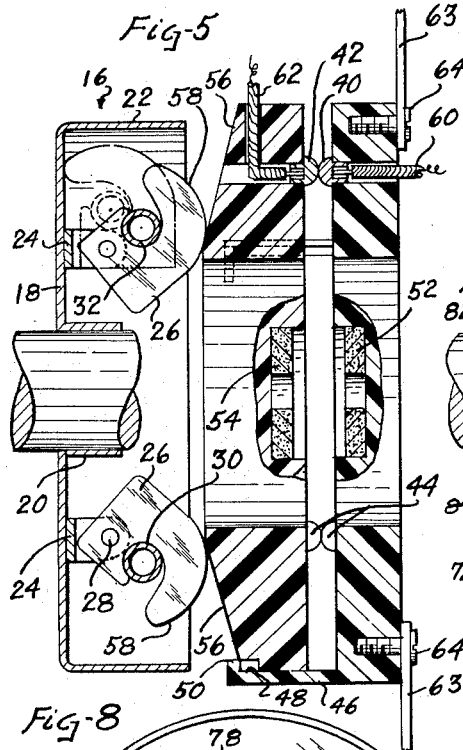
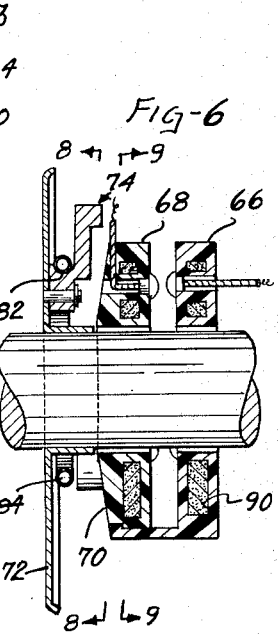
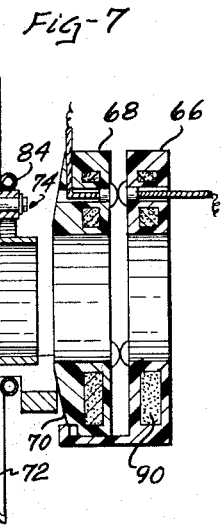
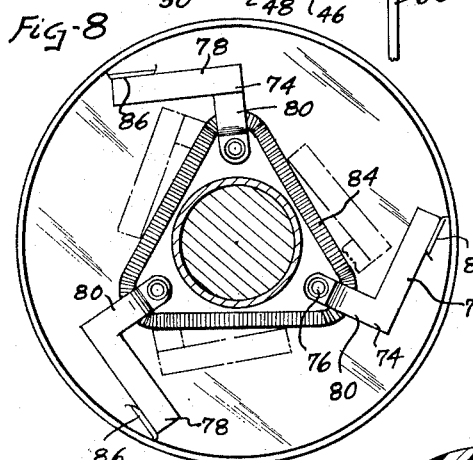
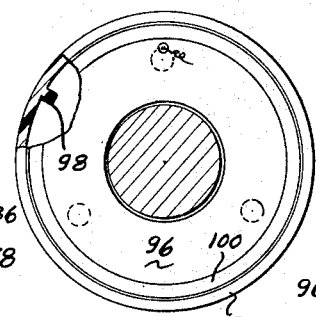
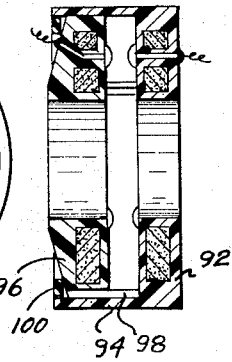
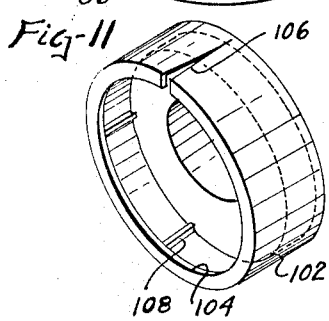
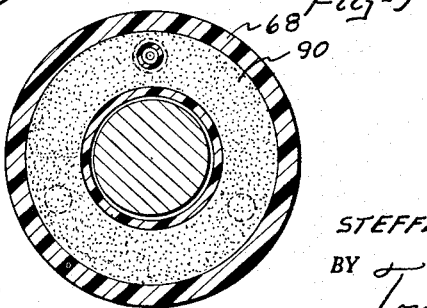
INVENTOR.
STEFFEN A BROWN
BY
ATTORNEYS ища
United States Patent Office 3,194,914
Patented July 13, 1965

3,194,914
CENTRIFUGAL SWITCH EMBODYING MAGNETS
Steffen A. Brown, % Brown-Brockmeyer Company,
1000 S. Smithville Road, Dayton 1, Ohio
Filed Nov. 14, 1960, Ser. No. 69,002
12 Claims. (Cl. 200—80)

This invention relates to electric switches and is particularly concerned with electric switches having permanent magnets associated therewith for urging the switch contacts in one direction or the other. More particularly still, this invention relates to switches for electric motors for controlling the starting winding, such as in the case of split phase motors.

Electric switches are, of course, well known, and basically, have two or more electric contacts which are brought into engagement to complete a circuit and which are separated from each other to interrupt the circuit. In connection with electric motors, for split phase motors, the starting winding is usually deenergized after the motor has come up to a predetermined rotational speed and remains deenergized until the motor drops to a speed substantially below said predetermined speed.

Electric switches for controlling the starting winding of split phase motors have heretofore taken many different styles and have often been a source of difficulty on account of their relatively short life or other operating faults. Since the switches are closed during the initial starting period of the motor and open while the motor is running, it is customary for the switch contacts to be sprung away from each other and to be urged toward each other by a speed sensitive actuator carried by the motor shaft.

A particular problem of switches of this nature is the possibility of aging or breaking of the contact separating spring as well as the usual deterioration of the contact points.

With the foregoing in mind, a general objective of the present invention is the provision of an improved electric switch, especially for electric motors, which eliminates the drawbacks referred to above that are encountered with the prior art structures.

Another object of this invention is the provision of an electric switch having contact elements to be urged apart but which switch does not embody metallic springs or the like.

A still further object of this invention is the provision of an improved actuator for the switch controlling the starting winding of an electric motor.

It is also an object of this invention to provide a switch unit which can be utilized as a replacement switch with which to replace defective switches in existing electric motors.

These and other objects and advantages of this invention will become more apparent upon reference to the following specification taken in connection with the accompanying drawings in which:

FIGURE 1 is a somewhat diagrammatic longitudinal sectional view through an electric motor having a switch according to the present invention mounted therein;

FIGURE 2 is a perspective view showing the actuator and switch of FIGURE 1;

FIGURE 3 is a sectional view indicated by line 3—3 on FIGURE 2;

FIGURE 4 is a sectional view indicated by line 4—4 on FIGURE 2;

FIGURE 5 is a vertical sectional view through the switch of FIGURES 1 through 4 drawn at somewhat enlarged scale;

FIGURE 5a is a sectional view showing a modification in which the two switch parts are pivotally interconnected;

FIGURE 6 is a vertical sectional view similar to FIGURE 5 but showing a different type actuator and showing the switch open;

FIGURE 7 is a vertical sectional view through the switch of FIGURE 6 but showing the switch closed;

FIGURE 8 is a sectional view indicated by line 8—8 on FIGURE 6 showing the actuator in elevation;

FIGURE 9 is a sectional view indicated by line 9—9 on FIGURE 6 showing the switch in elevation;

FIGURE 10 is a sectional view through a switch showing a somewhat modified construction;

FIGURE 11 is a perspective view showing one manner in which the cup portion of the switch could be formed; and FIGURE 12 is a sectional view through a modified form of the switch in which a large annular magnet is employed.

Referring to the drawings somewhat more in detail, the electric motor illustrated in FIGURE 1 is of the conventional split phase type having a stator 10 and a rotor 12. The stator 10 has running and starting windings thereon and in circuit with the starting winding is a switch structure generally indicated at 14 with which is associated a switch actuator generally indicated at 16.

When the rotor is not turning, the actuator holds the switch closed so that the starting winding is in circuit but when the rotor comes up to a predetermined speed, the actuator operates and the switch opens and interrupts the circuit to the starting winding.

Both the switch and the actuator therefor are of novel construction according to the present invention. The switch and actuator are illustrated somewhat in detail in FIGURES 2 through 5 wherein it will be seen that the actuator comprises a plate 18 having a central portion 20 adapted for being press fitted or otherwise fixedly connected to the shaft of the rotor. This plate may have an outer axially extending peripheral portion 22 but this portion can be dispensed with, if desired.

Mounted about the inner face of plate 18 are a plurality of U-shaped pivot members 24 adapted for pivotally supporting the actuator weights 26. Pins 28 may be availed of which extend through the legs of the members 24 and also through the actuator weights 26 so that the weights are supported on plate 18 for rotation therewith and for pivoting movements radially thereof. As illustrated, there may be three or more of the weights 26 and each thereof comprises a slot portion 30 so that after the weights are put in place on their pivotal supports, an endless garter spring 32 can be pressed through the slots and this will pull the weights inwardly.

In their inner positions, the weights are located as they are illustrated in full lines in FIGURE 5, and when the rotor speeds up to the point that the centrifugal force acting upon the weights overcomes the tension of the garter spring urging the weights inwardly, the weights will throw out into their dot-dash positions in FIGURE 5 until the upper nose portions thereof abut the plate 18.

As will be seen in FIGURE 4, the slots 30 extending through the weights may be arcuately formed as at 34 along their bottom surfaces to prevent sharply bending the garter spring.

Turning now to the switch structure 14, this comprises a first member 36 of electrical insulating material which will be of annular configuration if the motor shaft is to pass therethrough. Associated with member 36 in axial alignment therewith is a second member 38 of electrical insulating material. These members carry electrical contact elements 40 and 42, respectively, or there may be a plurality of pairs of contact elements. Preferably, the members 36 and 38 also carry arcuate abutment elements 44 so that the members 36 and 38 will remain in parallelism when the contact elements carried thereby are brought together.

In order to assure that the contact elements will always meet properly, the members 36 and 38 are keyed together as by finger element or finger keys 46 carried by one thereof, for example, member 36, and which extend into slots 48 formed in the other member. These finger keys also have hook like end parts 50 which operate to limit the separating movement of the members 36 and 38 while the arrangement provides for free movement of the members toward each other.

A particular novel feature of the present invention is in the means provided for urging the members 36 and 38 apart. Instead of springs or the like, I provide magnets 52 and 54 which are preferably sintered Alnico or some other suitably strong magnet material.

These magnets are mounted in the individual members 36 and 38 as will be seen in FIGURES 2 and 3 and are arranged in opposed relation so as to repel each other and in this manner serve to urge members 36 and 38 away from each other. These magnets can be molded directly into the members 36 and 38 when these members are of a molded plastic, or they can be mounted in recesses provided in the members therefor and they can be either close to the outer surface of the members or recessed backwardly therefrom, all as determined by the number and size and strength of the magnets in order to obtain the desired degree of separating force acting on members 36 and 38.

The magnets illustrated in FIGURES 2 and 3 consist of small annular magnets magnetized axially so that they can be placed in the members 36 and 38 with their correspondingly magnetized faces in opposite position. Three pairs of the magnets are employed, but it will be understood that there could be more than three pairs, if so desired, and the possibility, of course, exists for there to be fewer pairs. For some switches, two pairs of the magnets would probably be satisfactory and if the members 36 and 38 were to be pivotally interconnected, as illustrated in FIGURE 5a, one pair of magnets would suffice to develop the desired separating force when in members 36a and 38a to cause the switch to function in the desired manner.

As will be seen in FIGURES 2 and 5, the member 38 has a conical back wall 56 that is engaged by the arcuate backs 58 of the weights 26 when the weights are pulled inwardly by the garter spring 30.

The weights in engaging the conical back wall 36 or back wall 38 will serve to force member 38 toward member 36 to bring the aforementioned contact elements 40 and 42 carried thereby to engagement thus completing a circuit through wires 60 and 62 to the starting winding.

The stationary member 36 may be supported in any desired manner and is stationary within the motor frame. As illustrated, a support plate 63 may be provided, fixed inside the motor frame, as by being connected to one of the end members and supporting member 36 by means of screws 64.

The described switch arrangement is simple and inexpensive and eliminates all springs which can break and age, and requires no special construction inside the motor so that the switch can readily be replaced, not only in new manufacture but in existing split phase motors as well which may require a replacement switch.

This modification described above is the preferred modification but other arrangements are possible. In FIGURES 6 through 9, there is shown a switch arrangement and actuator in combination therewith in which the stationary part of the switch is indicated at 66 and the movable part is indicated at 68. The movable part 68 has a conical back wall 70.

The actuator support plate is indicated at 72 and there is pivoted thereto, as will best be seen in FIGURE 8, the L-shaped weights 74. These weights are supported on pivot pins 76 and have the weights proper, at 78 offset from the supporting arms 80 to form a ledge 82 as preferably grooved for receiving a garter spring 84. When the plate 72 is not rotating, the garter springs pull the weights inwardly to their dot-dash line positions in FIGURE 8, but when the plate comes up to a predetermined speed, the weights will throw outwardly against the restraint of garter spring 84 until they are stopped by the stop elements 86 formed in plate 72.

The portions of the weighted outer ends 78 of the arm 74 engage the conical back wall 70 of movable member 68 when the weights are pulled inwardly and move member 68 toward stationary member 66, as will be seen in FIGURE 7 thus bringing about closing of the switch when the rotor halts and opening of the switch when the rotor comes up to a predetermined speed.

The structure of FIGURES 6 through 9 also embodies a different magnet structure in that a single large annular magnet is mounted in each of the members 66 and 68. Such a magnet is indicated at 90 in FIGURE 12. This magnet is a relatively thin annular member also magnetized axially with the magnets in the two members 66 and 68 being arranged with their correspondingly magnetized faces in opposition so that the magnets repel each other.

While the members 66 and 68 have been illustrated as separate annular members, it is also possible for one thereof to include a skirt portion embracing the other so as to enclose the contact elements. An arrangement of this nature is illustrated in FIGURE 10 wherein stationary member 92 has an axially extending peripheral flange 94 forming a skirt that extends about the periphery of the movable member 96.

The flange or skirt is formed integrally with rib like key elements 98 that extend into slots in the member 96 so that the members are keyed together thus holding the contact elements in alignment. In the FIGURE 10 arrangement, a retaining ring 100 is secured inside of the skirt 94 after the member 96 is placed therein and this will prevent the members from becoming disassembled so that the switch can be handled as a unit.

It is also possible to form the skirt as illustrated in FIGURE 11 wherein the enclosing skirt portion 102 has an inwardly extending flange 104 integral therewith. One or more incisions 106 are formed in the skirt so that it can be expanded to receive therein the other member of the electric switch. One or more keying ribs 108 are provided in the skirt to key the two members of the switch together against relative rotation.

It will be understood that this invention is susceptible to modification in order to adapt it to different usages and conditions; and, accordingly, it is desired to comprehend such modifications within this invention as may fall within the scope of the appended claims.

I claim:

1. In combination; an electric switch comprising two co-axial ring members each having a pair of axially spaced sides with one side of each ring member facing the other and the other side facing in the opposite direction, electric contacts insulatingly carried by said members on the said one side thereof and in axially aligned relation, one of said members being stationarily supported and the other member being movable relative thereto in an axial plane to engage and disengage said contacts, magnetic means mounted in said members in opposing repelling relation so as continuously to urge the members away from each other, the said other side of said other member being in the form of a conical surface, and actuator means on the opposite side of said other member from said one member and comprising weight elements spring urged toward said conical surface and adapted to engage said conical surface for moving said other member toward said one member.

2. In combination; an electric switch comprising two co-axial ring members each having a pair of axially spaced sides with one side of each ring member facing the other and the other side facing in the opposite direction, electric contacts insulatingly carried by said members on the said one side thereof and in axially aligned relation, one of said members being stationarily supported and the other member being movable relative thereto to engage and disengage said contacts, magnet means mounted in said members in opposing repelling relation so as continuously to urge the members away from each other, the said other side of said other member being in the form of a conical surface, a plate on the opposite side of said other member from said one member, weight means pivoted on the plate on the side thereof facing said other member for outward swinging movement on the plate in response to centrifugal force, a garter spring engaging the weights and biasing them inwardly on the plate, and said weights in their inner positions engaging said conical surface and moving said other member toward the one member to cause engagement of said contact elements and in their outer positions releasing said other member for movement away from said one member under the influence of said magnet means.

3. In combination; an electric switch comprising two co-axial ring members each having a pair of axially spaced sides with one side of each ring member facing the other and the other side facing in the opposite direction, electric contacts insulatingly carried by said members on the said one sides thereof and in axially aligned relation, one of said members being stationarily supported and the other member being movable relative thereto to engage and disengage said contacts, magnet means mounted in said members in opposing repelling relation so as continuously to urge the members away from each other, the said other side of said other member being in the form of a conical surface, a plate on the opposite side of said other member from said one member, weights means pivoted on the plate on the side thereof facing said other member for outward swinging movement on the plate in response to centrifugal force, a garter spring engaging the weights and biasing them inwardly on the plate, and said weights in their inner positions engaging said conical surface and moving said other member toward the one member to cause engagement of said contact elements, said weights being pivoted on said plate on axes parallel with the plate and swinging in planes radial of and perpendicular to the plate.

4. In combination; an electric switch comprising two co-axial ring members each having a pair of axially spaced sides with one side of each ring member facing the other and the other side facing in the opposite direction, electric contacts insulatingly carried by said members on the said one sides thereof and in axially aligned relation, one of said members being stationarily supported and the other member being movable relative thereto to engage and disengage said contacts, magnets mounted in said members in opposing repelling relation so as continuously to urge the members away from each other, the said other side of said other member being in the form of a conical surface, a plate on the opposite side of said other member from said one member, weights means pivoted on the plate on the side thereof facing said other member for swinging movement on the plate in response to centrifugal force, a garter spring engaging the weights and biasing them inwardly on the plate, and said weights in their inner positions engaging said conical surface and moving said other member toward the one member to cause engagement of said contact elements, said weights being pivoted on said plate on axes normal to the plate and swinging in a plane parallel to the plate.

5. In a switch actuator, especially for an electric motor, a disc-like plate, means for fixedly mounting the plate on a motor shaft with the plane of the plate normal to the axis of the shaft, a plurality of weight members movably mounted on said plate in circumferentially spaced relation with regard to the axis of rotation of the plate when mounted on a shaft so the weight members will be urged outwardly by centrifugal force when the plate rotates, said weight members being pivoted to the plate on axes parallel to the plate and normal to radii of the plate passing therethrough, said weight members having outwardly opening notches formed therein located radially outwardly from said axes and on the opposite side of said axes from said plate, and a garter spring in said notches urging said weights inwardly, each weight member having a side facing axially away from said plate which is convex.

6. In a switch actuator, especially for an electric motor, a disc-like plate, means for fixedly mounting in the plate on a motor shaft, a plurality of weight members movably mounted on a radial portion of said plate in circumferentially spaced relation with regard to the axis of rotation of the plate when mounted on a shaft so the weight members will be urged outwardly by centrifugal force when the plate rotates, said weight member having arcuate surfaces thereon facing away from said plate, an endless garter spring engaging said weight members and urging said weight members inwardly on said plate, said weight members being pivoted to said radial portion of said plate on coplanar axes which are parallel to the plate and normal to planes radial to the plate and passing through the axes, each said weight member being formed with a notch located radially outwardly of the pivotal support of the respective weight member and said garter spring being engaged in said notches, said weight members having nose portions adapted to engage against the plate and stop the weight members in their outer positions before the points of engagement therewith of the garter spring passes axially inwardly beyond the radial plane which is parallel to said plate and which passes through the pivotal supports for said weight members.

7. In combination; an electric switch comprising two axially spaced members each having one side facing the other member and another side facing in the opposite direction, electric contacts insulatingly carried by said members on the said one sides thereof and in axial alignment, means for supporting one of said members stationarily and for supporting the other of said members for movement toward and away from said one member to effect the engagement and disengagement of said contacts, magnets mounted in said members in opposing repelling relation so as continuously to urge two said members away from each other, a rotary centrifugal actuator means adapted to engage said other side of said other member and located on the opposite side of said other member from said one member, said actuator means comprising weight elements spring urged inwardly and toward said other side of said other member, and said other side of said other member and which faces said actuator means being in the form of a surface for engagement by said weight elements for moving said other member toward said one member when the actuator is not rotating and said weight elements are moved inwardly.

8. In combination; an electric switch comprising two axially spaced members each having one side facing the other member and another side facing in the opposite direction, electric contacts insulatingly carried by said members on the said one sides thereof and in axial alignment, means for supporting one of said members stationarily and for supporting the other of said members for movement toward and away from said one member to effect the engagement and disengagement of said contacts, magnets mounted in said members in opposing repelling relation so as continuously to urge two said members away from each other, a rotary centrifugal actuator means adapted to engage with said other side of said other member and located on the opposite side of said other member from said one member, said actuator means comprising weight elements spring urged inwardly and toward said other side of said other member, said other side of said other member and which faces said actuator means being in the form of a surface for engagement by said weight elements for moving said other member toward said one member when the actuator is not rotating and said weight elements are moved inwardly, and means interconnecting said members operable for maintaining said members in a predetermined oriented position whereby to maintain said electric contact aligned with each other.

9. In combination; an electric switch comprising two axially spaced members each having one side facing the other member and another side facing in the opposite direction, electric contacts insulatingly carried by said members on the said one sides thereof and in axial alignment, means for supporting one of said members stationarily and for supporting the other of said members for movement toward and away from said one member to effect the engagement and disengagement of said contacts, magnets mounted in said members in opposing repelling relation so as continuously to urge said two members away from each other, a rotary centrifugal actuator means adapted to engage with said other side of said other member and located on the opposite side of said other member from said one member, said actuator means comprising weight elements spring urged inwardly and toward said other side of said other member, said other side of said other member and which faces said actuator means being in the form of a surface for engagement by said weight elements for moving said other member toward said one member when the actuator is not rotating and said weight elements are moved inwardly, and means interconnecting said members comprising means carried by said one member and extending in the direction of relative movement of said members and engaging the periphery of said other member and providing a stop therefor to limit the relative movement of said members away from each other, said means also engaging said members and preventing relative angular movement thereof so as to maintain said members in a predetermined oriented position and thereby maintain the said electric contact carried thereby in alignment.

10. In combination; an electric switch comprising two axially spaced members each having one side facing the other member and another side facing in the opposite direction, electric contacts insulatingly carried by said members on the said one sides thereof and in axial alignment, means for supporting one of said members stationarily and for supporting the other of said members for movement toward and away from said one member to effect the engagement and disengagement of said contacts, magnets mounted in said members in opposing repelling relation so as continuously to urge two said members away from each other, a rotary centrifugal actuator means adapted to engage with said other side of said other member and located on the opposite side of said other member from said one member, said actuator means comprising weight elements spring urged inwardly and toward said other side of said other member, said other side of said other member and which faces said actuator means being in the form of a surface for engagement by said weight elements for moving said other member toward said one member when the actuator is not rotating and said weight elements are moved inwardly, and means pivotally interconnecting said members at one lateral side thereof so that the movement of the members toward and away from each other is accomplished by tilting movement of said other member on said one member.

11. In combination; an electric switch comprising two axially spaced members each having one side facing the other member and another side facing in the opposite direction, electric contacts insulatingly carried by said members on the said one sides thereof and in axial alignment, means for supporting one of said members stationarily and for supporting the other of said members for movement toward and away from said one member to effect the engagement and disengagement of said contacts, magnets mounted in said members in opposing repelling relation so as continuously to urge two said members away from each other, a rotary centrifugal actuator means adapted to engage with said other side of said other member and located on the opposite side of said other member from said one member, said actuator means comprising weight elements spring urged inwardly and toward said other side of said other member, said other side of said other member and which faces said actuator means being in the form of a surface for engagement by said weight elements for moving said other member toward said one member when the actuator is not rotating and said weight elements are moved inwardly, said magnets mounted in said members comprising disc magnets.

12. In combination; an electric switch comprising two axially spaced members each having one side facing in the opposite direction, electric contacts insulatingly carried by said members on the said one sides thereof and in axial alignment, means for supporting one of said members stationarily and for supporting the other of said members for movement toward and away from said one member to effect the engagement and disengagement of said contacts, magnets in said members arranged in repelling arrangement so as continuously to urge two said members away from each other, a rotary centrifugal actuator means adapted to engage with said other side of said other member and located on the opposite side of said other member from said one member, said actuator means comprising weight elements spring urged inwardly and toward said other side of said other member, said other side of said other member and which faces said actuator means being in the form of a surface for engagement by said weight elements for moving said other member toward said one member when the actuator is not rotating and said weight elements are moved inwardly, said magnets being mounted in said members so as to be in spaced relation in the direction of movement of said members when said contact elements are engaged.

References Cited by the Examiner

UNITED STATES PATENTS

| 2,254,709 | 9/41 | Pepper | 200—80 |
| 2,669,619 | 2/54 | Scheid et al. | 200—80 |
| 2,673,907 | 3/54 | Purdy | 200—80 |
| 2,812,401 | 11/57 | Waters | 200—80 |
| 2,985,734 | 5/61 | Howell et al. | 200—67 |

BERNARD A. GILHEANY, *Primary Examiner.*

MAX L. LEVY, *Examiner.*